UNITED STATES PATENT OFFICE.

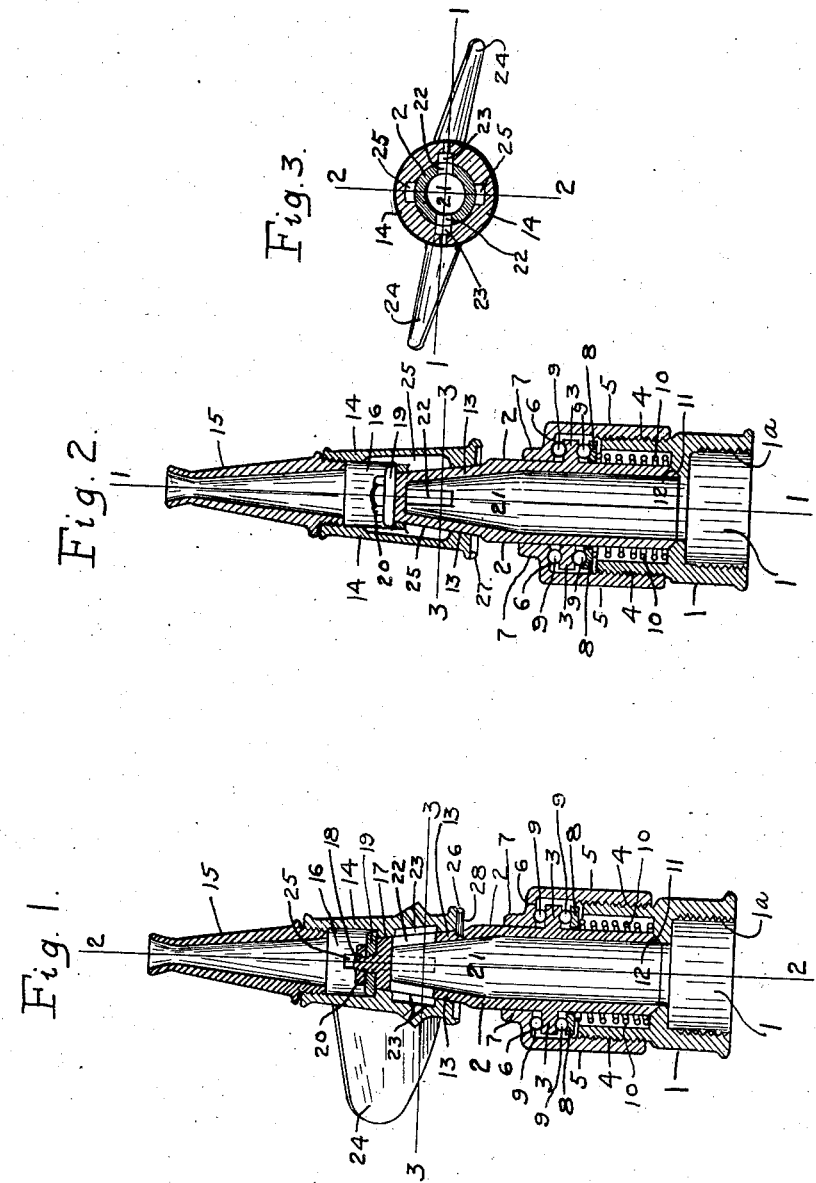

RUDOLF LINDNER, OF ERIE, PENNSYLVANIA.

SPRINKLER.

1,025,410.  Specification of Letters Patent.  Patented May 7, 1912.

Application filed September 17, 1909. Serial No. 518,201.

*To all whom it may concern:*

Be it known that I, RUDOLF LINDNER, a subject of the Emperor of Austria-Hungary, residing at Erie, in the county of Erie and State of Pennsylvania, have invented new and useful Improvements in Sprinklers, of which the following is a specification.

This invention relates to sprinklers, and consists in certain improvements in the construction thereof as will be hereinafter fully described and pointed out in the claims.

The invention is illustrated in the accompanying drawings as follows:

Figure 1 shows a central longitudinal section through the sprinkler; Fig. 2 a central longitudinal section of the nozzle, the section being on the line 2—2 in Fig. 1; Fig. 3 a section on the line 3—3 in Fig. 1, looking toward the top of Fig. 1.

1 marks the supply chamber. This is preferably supplied with the screw threads 1ª, adapted to be screwed onto the ordinary hose fitting. The rotating member 2 connects with the supply chamber 1. It has a flange 3 the two surfaces of which form race ways for ball bearings. The exterior of the supply chamber 1 is screw threaded at 4, and the flange cap 5 screwed onto the screw threads 4. The flange 6 on this cap forms a race way opposing the flange 3, and a neck 7 on this flange cap is arranged around the rotating member. A washer 8 forms a race way also opposing flange 3, and the balls 9 are arranged on each side of the flange 3, and between the flanges 6 and 3 and the washer 8 and the flange 3, thus completing the ball bearing. The spring 10 yieldingly holds the washer 8 against the balls. A joint surface 11 is arranged in the chamber 1, and the rotating member 12 has a similar surface.

The cap 4 is made adjustable so as to carry the member 2 into such relation with the member 1 that the surfaces 11 and 12 form a joint sufficiently tight to prevent excessive leakage and still permit of easy rotation of the rotating member. The spring 10 permits of this adjustment without disarranging the ball bearing. Where it is desired to entirely close the joint between the surfaces 11 and 12, this may be done by adjusting the cap 5 so as to crowd the surface 12 on the member 2, into close contact with the surface 11 on the supply chamber.

The rotating member 2 has a valve plug 13 formed on its upper end, and a nozzle 14 is mounted on this plug. The nozzle 14 has an axial jet end 15, separably connected with the nozzle. The nozzle preferably has a cavity 16 into which the jet end 15 is crowded. This cavity has the shoulder 17 at the bottom, and a valve plug extends through this shoulder having a screw threaded extension 18 in the cavity 16. The washer 19 is arranged on this extension against the shoulder 17, and an end 20 is screwed onto the extension 18 against the washer. In this way the valve plug 13 is held in the nozzle.

The valve plug has a central opening or way 21, and the radial ways 23, the valve plug being preferably closed at its outer end. The ways 22 are adapted to be brought into register with the ways 23, forming radial jet openings. Vanes 24 extend from the jet nozzle in the path of the jet from the jet openings 23, and are so deflected with relation to such jets that the nozzle is rotated by the force of the jets on the vanes. The vanes also spread the jets slightly, so that while they have sufficient force to cover a wide range, yet the spread of the jet is such as to cover this range uniformly.

Bypasses 25 are arranged in the nozzle 14. These bypasses are quartering to the ways 23, the bypasses leading to a point in the nozzle to permit of the ways 22 being brought into register with the bypasses 25. The bypasses extend into the cavity 16, and consequently supply the axial jet. By turning the nozzle 14 on the valve plug, the ways 22 may be brought into register with the ways 23 when a rotating sprinkler is formed. On the other hand, the ways 22 may be brought into register with the bypasses 25 when an axial jet nozzle is formed. I prefer to provide the shoulders 26 and 27 on the nozzle, and a stop pin 28 on the plug, so as to locate the ways 22 with the ways 23 and the bypasses 25.

Where the device is used with the axial jet nozzle, the cap 5 may be screwed down to form a tight joint at the surfaces 11 and 12 and the ways 22 being brought into register with the bypasses 25, the radial ways are cut off. Where it is desired to use the device as a rotating sprinkler, the ways 22 may be brought into register with the ways 23 and the rotating member and supply member loosened sufficiently to permit of the free rotation.

What I claim as new is:

1. In a sprinkler, the combination of a rotating member; a valve plug formed thereon having a radial way therethrough; a nozzle mounted on the plug having a cavity in the end and having a radial jet opening adapted to be brought into register with the way in the plug; and bypasses adapted to be brought into register with the ways in the plug, and leading into a cavity in the end of the nozzle; and means arranged in the cavity in the end of the nozzle for securing the plug in the nozzle.

2. In a sprinkler, the combination of a rotating member; a valve plug formed thereon having a radial way therethrough; a nozzle mounted on the plug having a cavity in the end; radial jet openings adapted to be brought into register with the way in the plug, and bypasses adapted to be brought into register with the way in the plug, and leading into the cavity in the end of the nozzle; means arranged in the cavity in the end of the nozzle for securing the plug in the nozzle; and an axial jet end screwed into the cavity.

3. In a sprinkler, the combination of a rotating member; a valve plug formed thereon having a radial way therethrough; a nozzle mounted on the plug having a cavity in the end, radial jet openings adapted to be brought into register with the way in the plug, and bypasses adapted to be brought into register with the way in the plug, and leading into the cavity in the end of the nozzle; means arranged in the cavity in the end of the nozzle for securing the plug in the nozzle; and vanes on the nozzle in the path of the jets from the radial openings.

4. In a sprinkler, the combination of a stationary member; a rotary member forming a joint with the stationary member; means for adjusting the joint; a valve plug on the rotary member, the plug having a radial way therein; a nozzle mounted on the plug with a radial way adapted to be brought into register with the way of the plug and a bypass adapted to be brought into register with the way of the plug; and means actuated by the energy of the passing fluid for rotating the rotating member.

5. In a sprinkler, the combination of a stationary member; a rotary member forming a joint with the stationary member; means for adjusting the joint; a valve plug on the rotary member; the plug having a radial way therein; a nozzle mounted on the plug having a radial way adapted to be brought into register with the way of the plug and a bypass adapted to be brought into register with the way of the plug; and vanes on the rotating member in the path of the jet from the radial way in the nozzle.

In testimony whereof, I have hereunto set my hand in the presence of two subscribing witnesses.

RUDOLF LINDNER.

Witnesses:
H. C. LORD,
MARGARET M. BEIGLE.

---

Copies of this patent may be obtained for five cents each, by addressing the "Commissioner of Patents, Washington, D. C."